United States Patent
Wang et al.

(10) Patent No.: US 7,715,369 B1
(45) Date of Patent: *May 11, 2010

(54) COMMON BACKPLANE FOR PHYSICAL LAYER SYSTEM AND NETWORKING LAYER SYSTEM

(75) Inventors: Eugene T. Wang, Fremont, CA (US); Nang Tran, San Jose, CA (US); Norman Tang, San Jose, CA (US); Vu Nguyen, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 793 days.

This patent is subject to a terminal disclaimer.

(21) Appl. No.: 11/346,885

(22) Filed: Feb. 2, 2006

Related U.S. Application Data

(63) Continuation of application No. 09/346,110, filed on Jun. 30, 1999, now Pat. No. 7,161,930.

(51) Int. Cl.
*H04L 12/66* (2006.01)
(52) U.S. Cl. ...................................... 370/352
(58) Field of Classification Search ............... None
See application file for complete search history.

(56) References Cited

U.S. PATENT DOCUMENTS

| | | |
|---|---|---|
| 5,353,282 A | 10/1994 | Dormer et al. |
| 5,384,766 A | 1/1995 | Yamato et al. |
| 5,408,469 A | 4/1995 | Opher et al. |
| 5,412,652 A | 5/1995 | Lu et al. |
| 5,526,349 A | 6/1996 | Diaz et al. |
| 5,557,778 A | 9/1996 | Vaillancourt |
| 5,664,107 A | 9/1997 | Chatwani et al. |
| 5,734,656 A | 3/1998 | Prince et al. |
| 5,737,334 A | 4/1998 | Prince et al. |
| 5,818,842 A | 10/1998 | Burwell et al. |
| 5,850,398 A | 12/1998 | King, Jr. |
| 5,903,544 A | 5/1999 | Sakamoto |
| 5,999,528 A | 12/1999 | Chow et al. |
| 6,078,595 A | 6/2000 | Jones et al. |
| 6,081,530 A | 6/2000 | Wiher et al. |

(Continued)

OTHER PUBLICATIONS

The inventorship entity was aware of SONET system backplanes that only supported SONET switchcards and ATM system backplanes that only supported ATM switchcards prior to Jun. 2, 1999.

(Continued)

*Primary Examiner*—Anh-Vu Ly
(74) *Attorney, Agent, or Firm*—Schwegman, Lundberg & Woessner, P.A.

(57) ABSTRACT

A backplane having a switch card interface and an adapter card interface where the switch card interface has input/outputs in an arrangement that functionally mate to a networking layer system switch card and a physical layer system switch card. The adapter card interface is coupled to the switch card interface. The adapter card interface has input/outputs in an arrangement that functionally mates to a networking layer system adapter card and a physical layer system adapter card. A method that involves forming a first and second backplane according to a manufacturing process, integrating the first backplane into a networking layer system switch, and integrating the second backplane into a physical layer system switch.

11 Claims, 13 Drawing Sheets

U.S. PATENT DOCUMENTS

| | | | |
|---|---|---|---|
| 6,134,238 | A | 10/2000 | Noh |
| 6,141,339 | A * | 10/2000 | Kaplan et al. .......... 370/395.61 |
| 6,151,305 | A | 11/2000 | Chen |
| 6,301,269 | B1 | 10/2001 | Tayloe |
| 6,317,439 | B1 | 11/2001 | Cardona |
| 6,349,037 | B1 | 2/2002 | Draughn et al. |
| 6,359,859 | B1 | 3/2002 | Brolin et al. |
| 6,373,837 | B1 | 4/2002 | Kleyman |
| 6,560,219 | B1 | 5/2003 | Tabu et al. |
| 6,587,470 | B1 * | 7/2003 | Elliot et al. ................. 370/404 |
| 6,798,779 | B1 | 9/2004 | Shimbashi et al. |
| 7,039,065 | B2 * | 5/2006 | Czerwiec et al. ............ 370/463 |
| 7,161,930 | B1 * | 1/2007 | Wang et al. ................. 370/352 |
| 2006/0092968 | A1 * | 5/2006 | Brolin et al. ................ 370/465 |

OTHER PUBLICATIONS

Thomas C. Banwell et al., "Physical Design Issues for Very Large ATM Switching Systems", Communications, vol. 9, No. 8, Oct. 1991, pp. 1227-1238.

Hirokau Ohnishi et al., "All Band Switching Node Architecture for Flexible and Cost-Effective Evolution Toward B-IDSN", Synposium, vol. 1, Apr. 1995, pp. 57-61.

Erwin P. Rathgeb et al., "The MainstreetXpress Core Service Node-A Versatile ATM Switch Architecture for the Full Service Network", Communications, vol. 15, No. 5, Jun. 1997, pp. 795-806.

Eugene T. Wang, U.S. Appl. No. 09/346,110, filed Jun. 30, 1999 "Common Backplane for Physical Layer System and Networking System", p. 2, line 9 to p. 4, line 10 of the present application.

Eugene T. Wang, U.S. Appl. No. 09/346,110, filed Jun. 30, 1999 "Common Backplane for Physical Layer System and Networking System", p. 4, line 17 to p. 7, line 16 of the present application.

"U.S. Appl. No. 09/346,110, Final Office Action mailed Mar. 29, 2005", 13 pgs.

"U.S. Appl. No. 09/346,110, Final Office Action mailed Sep. 8, 2004", 11 pgs.

"U.S. Appl. No. 09/346,110, Non Final Office Action mailed Feb. 13, 2003", 2 pgs.

"U.S. Appl. No. 09/346,110, Non Final Office Action mailed Jul. 18, 2002", 12 pgs.

"U.S. Appl. No. 09/346,110, Non Final Office Action mailed Aug. 4, 2003",6 pgs.

"U.S. Appl. No. 09/346,110, Notice of Allowance mailed Aug. 15, 2006",7 pgs.

"U.S. Appl. No. 09/346,110, Notice of Allowance mailed Dec. 27, 2005",7 pgs.

"U.S. Appl. No. 09/346,110, Response filed Jan. 12, 2005 to Final Office Action mailed Sep. 8, 2004", 16 pgs.

"U.S. Appl. No. 09/346,110, Response filed May 13, 2003 to Non Final Office Action mailed Feb. 13, 2003", 16 pgs.

"U.S. Appl. No. 09/346,110, Response filed Nov. 4, 2003 to Non Final Office Action mailed Aug. 4, 2003", 13 pgs.

"U.S. Appl. No. 09/346,110, Response filed Nov. 18, 2002 to Non Final Office Action mailed Jul. 18, 2002", 16 pgs.

"TADM042G5 (ORLEANS) SONET/SDH: 155/622/2488 Mbits/s Interface", *Lucent Technologies, Draft Copy V 0.2*, (Sep. 1998), 64 pgs.

* cited by examiner

FIG. 3B
(Cont.)
From Fig. 3B
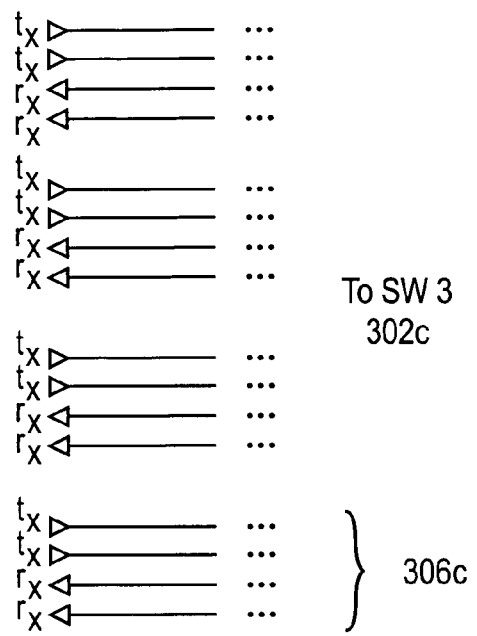
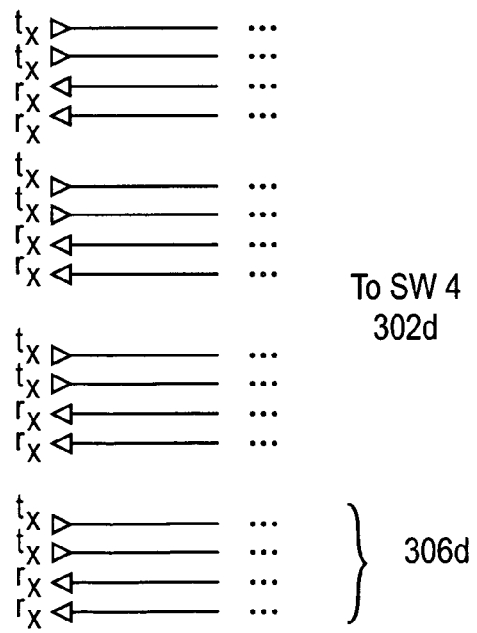

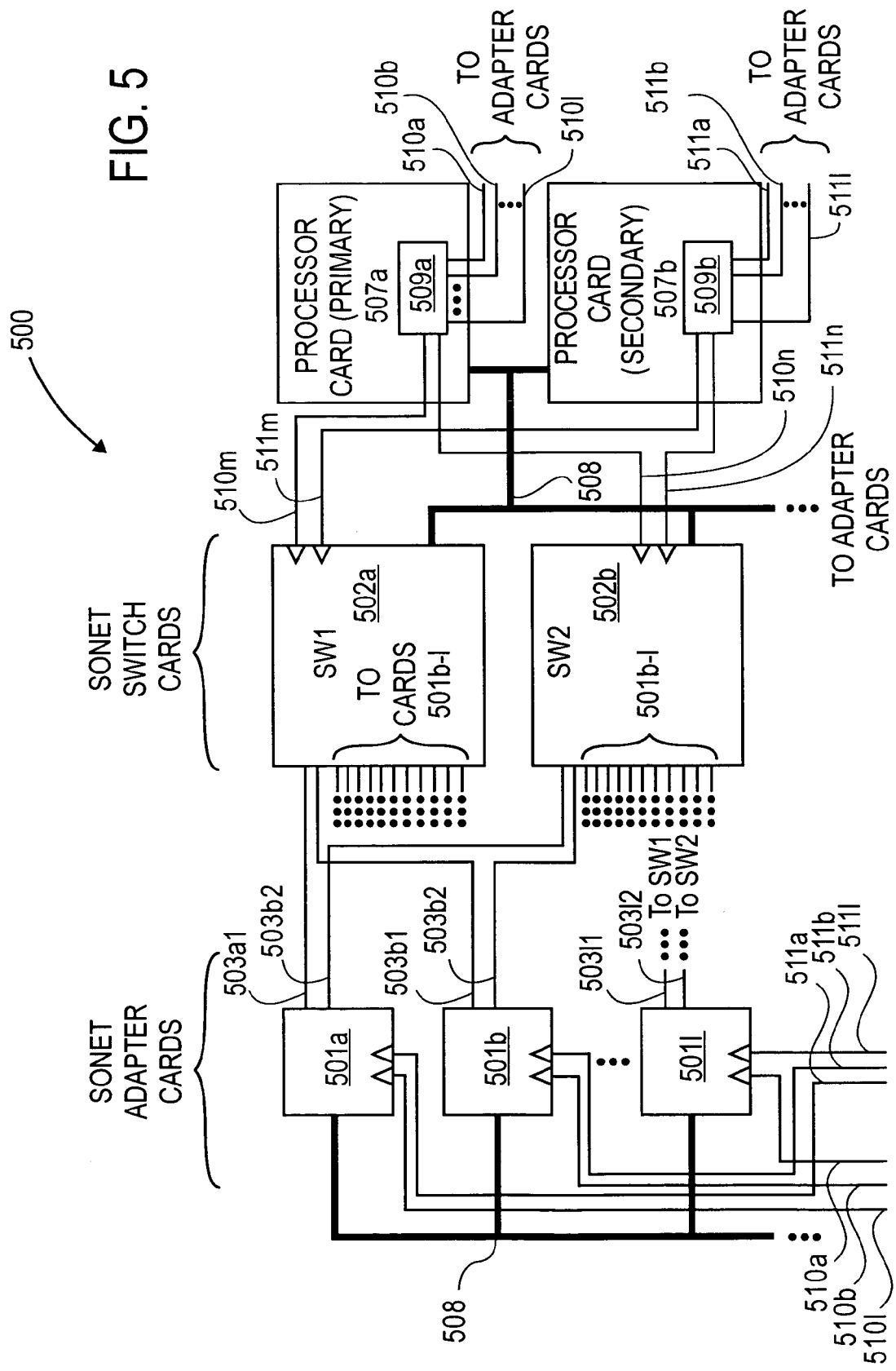

COMMON BACKPLANE FOR PHYSICAL LAYER SYSTEM AND NETWORKING LAYER SYSTEM

REFERENCE TO RELATED APPLICATION

This application is a continuation of application Ser. No. 09/346,110 filed Jun. 30, 1999, now U.S. Pat. No. 7,161,930, which is herein incorporated by reference.

FIELD OF INVENTION

The field of the invention relates generally to networking hardware and, more specifically, to the design and fabrication of a common backplane for physical layer and networking layer systems.

BACKGROUND OF THE INVENTION

FIG. 1a shows a typical networking hardware system 100a with its cover removed. The system 100a (also called a machine or switch or box) typically comprises a power supply 101, a cooling element (such as a fan not shown in FIG. 1), a backplane 103, card interfaces 104a-e attached to backplane 103 and various cards 105a-e inserted into the card interfaces 104a-e. In networking hardware applications the cards are typically organized into three categories: adapter cards (e.g., adapter cards 105a-c), switch or routing cards (e.g., switch or routing card 105d), and processor cards (e.g., processor card 105e).

Usually, most of the cards 105 plugged into a working networking switch (or router) are adapter cards 105a-c. Adapter cards 105a-c are typically used as an interface between the network(s) the switch 100b is connected to and the switch card 105d. The switch card 105d is responsible for collecting all incoming traffic from the adapter cards 105a-c and redirecting the traffic to its appropriate adapter cards 105a-c for outbound traffic flow. The processor card 105e typically has a processing core (e.g., a microprocessor) used to execute the machine's maintenance/configuration software. Although FIG. 1a shows a box 100a,b having only one switch card 105d and processing card 105e, it is possible to have more than one of each of these. Multiple switch cards 105d may be employed to expand system bandwidth and/or provide redundancy. Multiple processing cards 105e may be used for redundancy as well.

All these cards communicate with one another via the backplane 103. The cards are typically connected to the backplane via a card interface 104 which may provide mechanical support for the card as well as electrical connection between the card and the backplane 103. The backplane 103 typically comprises conductive traces (also referred to as nets or wiring) between specific input/outputs associated with each of the card interfaces 104a-e. Thus the backplane 103 is an important and necessary feature of not only a machine's mechanical design but also a its electrical design.

As a networking machine 100 becomes more complex so does the sophistication of the backplane 103. For example, high bandwidth machines (i.e., high end leading edge equipment) typically have multiple switch cards 105b (in order to maximize system bandwidth) each of which require communication with most if not all adapter card interfaces 104a-c. As high bandwidth machines can support more adapter card traffic than lower end machines, such high end machines also have larger banks of adapter cards (as compared to lower bandwidth machines). Properly interconnecting all the various card slots typically requires the backplane to be implemented with multiple (e.g., 20, 22 or more) metal layer electrical cards. Furthermore, the input/output count (i.e., the number of available input/outputs per card interface 104) significantly expands as well.

Because backplanes 103 can be complicated, it is difficult to implement a standard backplane platform. That is, different high end machines require custom backplane designs unique to (and usable only with) one machine. As such, it is difficult to implement a single backplane design that is workable with a number of different machines.

Having the same backplane across varied product lines reduces both development and manufacturing costs substantially. One area of product lines where a common platform is needed concerns SONET (Synchronous Optical NETwork) switch products and ATM (Asynchronous Transfer Mode) switch products. These products may be referred to not only as SONET or ATM switches respectively; but also as machines, systems, or boxes.

SONET switches are used as physical layer extensions. That is, using the B-ISDN ATM reference model, SONET switches do not typically execute networking level functions beyond the physical layer. ATM switches, on the other hand, provide full networking capability which extends their functionality into the AAL layer. As such, the switch cards of the ATM machine tend to be more complex and sophisticated as compared to the SONET machine switch cards.

Nevertheless, there is some commonality between the two machines. Specifically, since ATM frequently uses SONET as a physical layer technology, there tends to be design overlap among ATM switch adapter cards and SONET switch adapter cards. For example, the front end fiber optics and supporting chipsets will tend to be identical (or nearly so) when the adapter cards from the two machines are compared.

Referring to FIG. 1a, a backplane 103 is an electrical card (also referred to ask a PC board or planar board) having card interfaces 104a-e and conductive traces (also referred to as nets or lines or traces or wiring). The backplane is typically comprised of multiple layers of conductive material, each separated from the other by dielectric. The conductive layers are typically formed into individual traces by a lithographic patterning process that employs masks. Mask sets are used to project images of the specific conducting trace patterns associated with each metal layer in a PC board.

PC boards are typically manufactured by forming a conductive layer, patterning the conductive layer (usually with a lithographic process that employs a mask set), forming a dielectric layer over the conductive layer and then repeating the above while also forming contacts through the dielectric to a trace below where needed. Such a process is an example of a manufacturing process. For backplane manufacturing, the manufacturing process may also include affixing card interfaces to the PC board.

FIG. 1B shows a partial schematic of the backplane 103 of FIG. 1A. It is important to note that typically more than one trace exists between cards. Furthermore, other backplane connections such as power and ground, and their associated input/outputs are not shown in FIG. 1B for simplicity. Referring to FIG. 1B, the conductive traces 120a-n within the backplane 103 are used to carry electrical signals between specific input/outputs 121a-n associated with each of the card interfaces 104a-e. input/outputs are any conductive material associated with a card interface 104a-e used to make electrical contact to a card 105a-e (such as metal pins, edges, or sockets). Since the direction of information flow through a specific input/output is up to the designer (i.e., may be either into the backplane 103 or out of the backplane, 103), input/outputs may be used either as inputs or outputs.

Input/outputs are typically housed within a card interface 104a-e such that they face their respective card 105a-e (as opposed to the backplane 103). Each input/output is usually electrically coupled to a specific backplane 103 net 120a-n via the card interface 104a-e itself. Thus, an electrical connection to an input/output corresponds to an electrical connection to its associated backplane 103 net as well (e.g., input/output 121a and net 120a). Furthermore, multiple input/outputs typically reside in a card interface 104. Each card 105a-e is designed such that card nets 124a-n that "mate with" the card interface 104a-e make electrical connection with the input/outputs 121a-n. In this manner, electrical connection between card nets 124a-n and backplane nets 120a-n is realized (e.g. input/outputs 121a, net 120a and net 124a).

Thus, card interfaces 104a-e are used to connect cards to a backplane. They typically provide mechanical support as well as electrical connection between the card 105a-e and the backplane 103. An example of a card interface 104a-e is a connector (frequently made of plastic with copper pins) that is soldered to the backplane PC board. Cards 105a-e are typically "plugged into" card connectors and make electrical connection to the backplane signal traces 120a-n via the input/outputs 121a-n.

Thus the input/outputs 121a-n may be viewed as a physical translation between card nets 124a-n and backplane nets 120a-n. In order for cards 105 to properly communicate with one another, backplane nets 120a-n should be properly connected at both ends (or more if applicable) to their associated card 124a-n nets (e.g., card net 124a, input/output 121a, backplane net 120a, input/output 121a2 and card net 124a2).

For example, a clock driver net on one card should be connected to a backplane net that is also connected to a clock receiver net on another card. As backplane nets should be "tracked" as to their specific, corresponding card net; input/outputs should similarly be tracked since they are the translation between the two nets. That is, continuing with the former example, a clock driver input/output should mate (or otherwise connect) to a clock driver net on its associated card and a clock receiver input/output should mate with a clock receiver net on its associated card.

Other examples are as follows: power supply card nets should mate with power supply input/outputs, ground plane card nets should mate with ground plane input/outputs, specific data signal nets on a card should mate with their corresponding data signal input/outputs, etc. The multitude of various input/outputs are arranged in the card interface such that each "lines up" and makes electrical contact with its associated card net. Therefore, card interfaces have an arrangement of input/outputs that functionally mate to its corresponding card.

As discussed ahead, one aspect concerns the ability of the backplane to functionally mate one arrangement of input/outputs to two different cards. For example, the same arrangement of input/outputs are designed to functionally mate to both an ATM switch card and a SONET switch card. It may therefore be alternately said, that the backplane has an arrangement of ATM switch card input/outputs in a card interface and an arrangement of SONET switch card input/outputs in the same card interface where the ATM switch card input/outputs and the SONET switch card input/outputs are the same input/outputs. The same may be said for backplane input/outputs designed to mate to adapter cards as well.

Also, the card 105a-e itself may have a backplane connector (not shown in FIG. 1B) that plugs into or otherwise mates to the card interface 104a-e. Such a connector typically has its own input/outputs (connected to the card nets 124a-n) that mate to the card interface input/outputs 121a-n.

SUMMARY OF THE INVENTION

A backplane is described having a switch card interface and an adapter card interface where the switch card interface has input/outputs in an arrangement that functionally mates to a networking layer system switch card and a physical layer system switch card. The adapter card interface is coupled to the switch card interface. The adapter card interface has input/outputs in an arrangement that functionally mates to a networking layer system adapter card and a physical layer system adapter card.

A method is described comprising forming a first and second backplane according to a manufacturing process, integrating the first backplane into a networking layer system, and integrating the second backplane into a physical layer system.

The other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 5 shows an embodiment of a SONET switch.

DETAILED DESCRIPTION

A backplane is described having a switch card interface and an adapter card interface where the switch card interface has input/outputs in an arrangement that functionally mates to a networking layer system switch card and a physical layer system switch card. The adapter card interface is coupled to the switch card interface. The adapter card interface has input/outputs in an arrangement that functionally mates to a networking layer system adapter card and a physical layer system adapter card.

A method is described involving forming a first and second backplane according to a manufacturing process, integrating the first backplane into a networking layer system switch, and integrating the second backplane into a physical layer system.

One of the advantages realized by these embodiments is manufacturing efficiency and reduced system production costs.

Figure 1A:
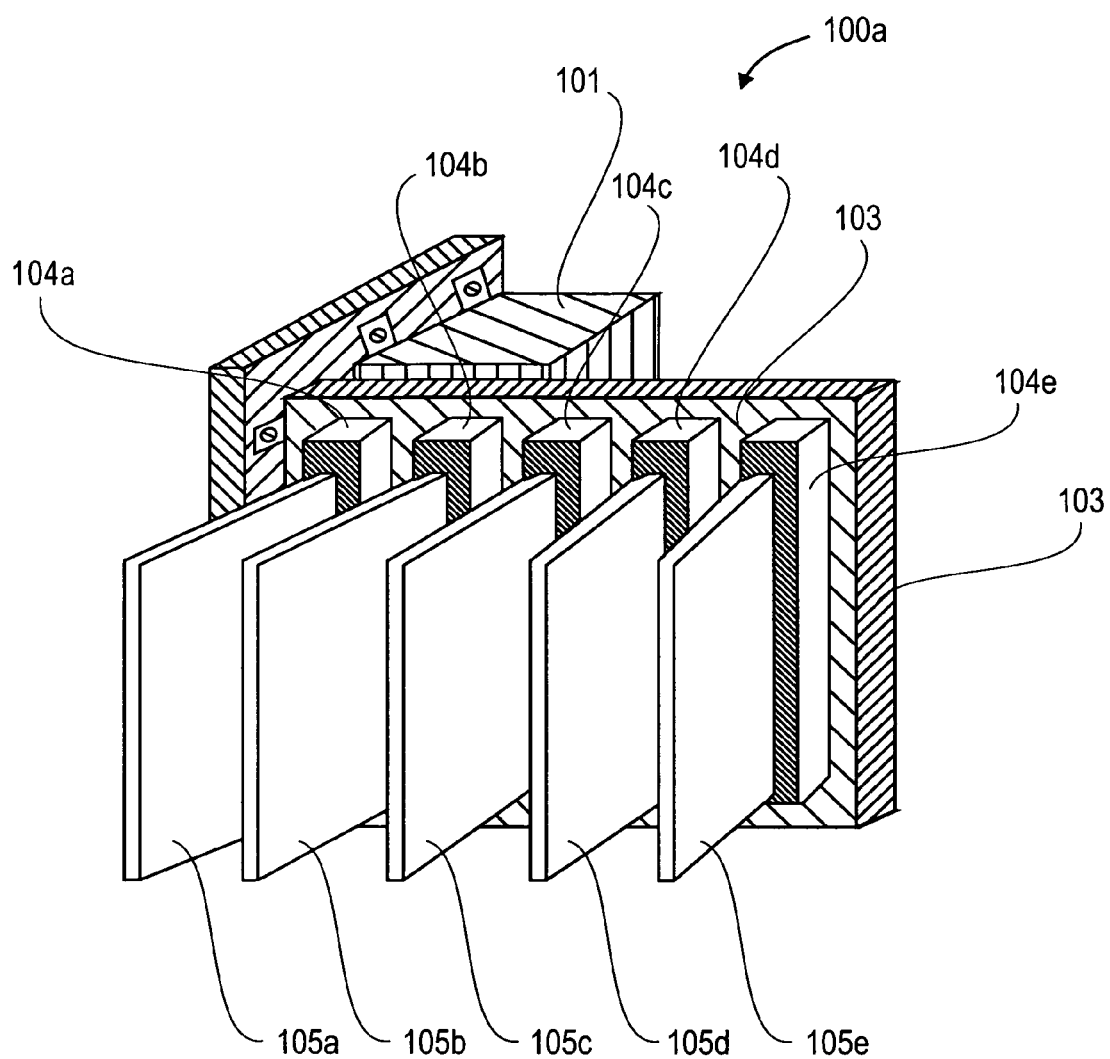
FIG. 1A shows a typical prior art networking hardware system.
Figure 1B:
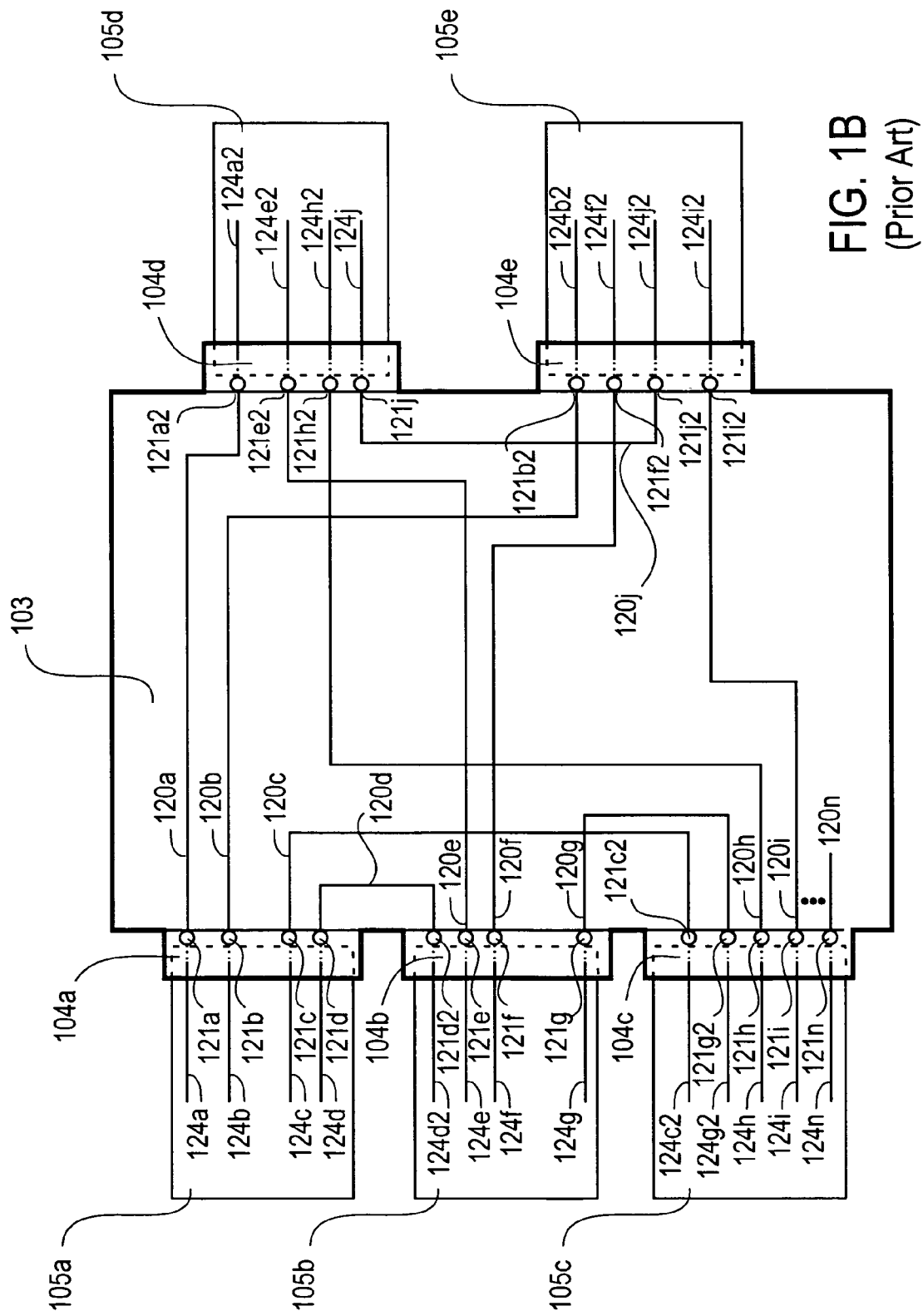
FIG. 1B shows a prior art arrangement of input/outputs that functionally mate to a backplane.
Figure 2:
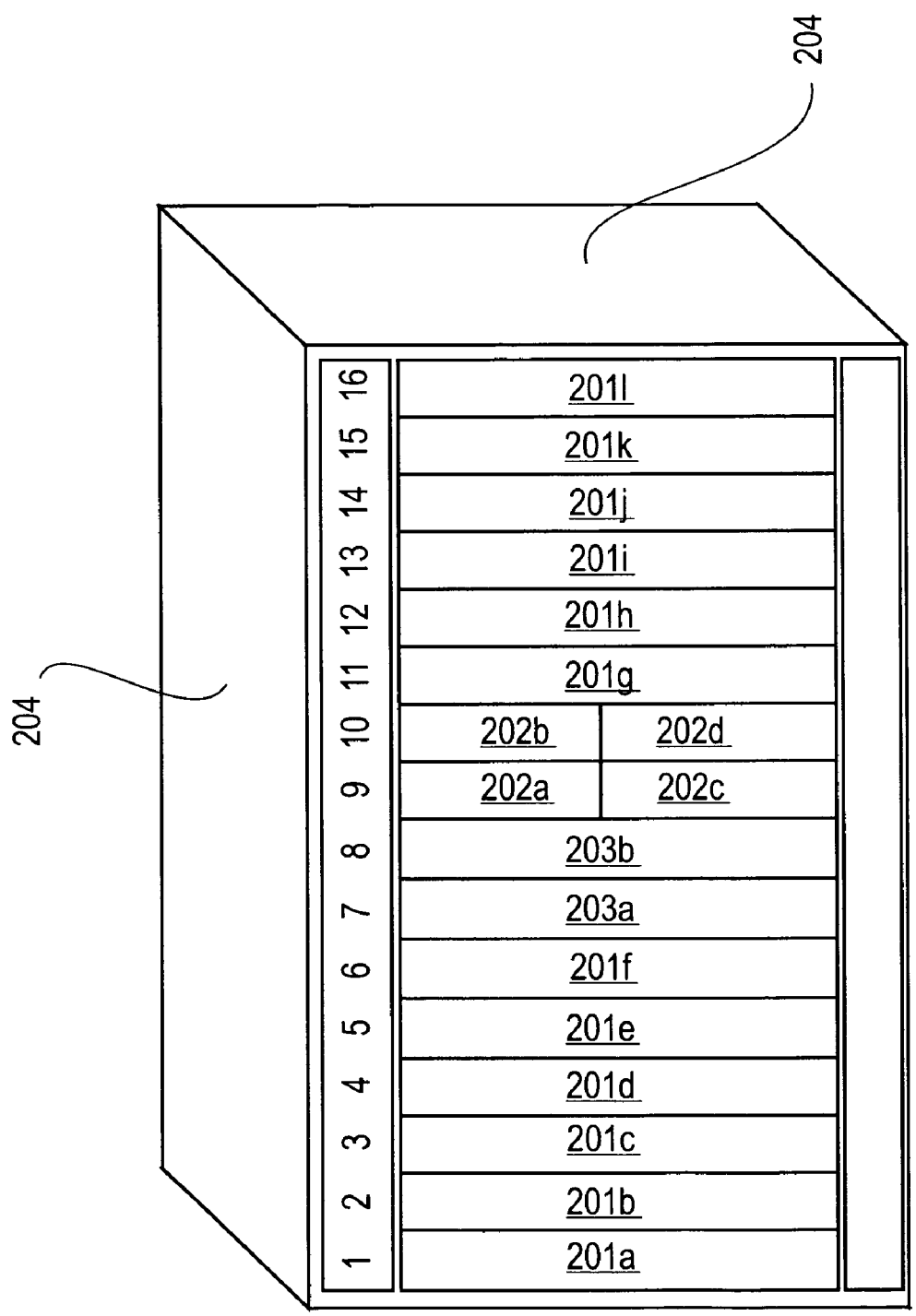
FIG. 2 shows one embodiment of a networking hardware system.

FIG. 2 shows one embodiment of a networking hardware system having twelve adapter card slots 201a-1 and four switch card slots 202a-d. Also shown in FIG. 2 are two processor card slots 203a-b. Typically, one processor card is active while the other is a redundant standby. The card interfaces (e.g., interfaces 104 of FIG. 1) attached to the backplane are not in view since FIG. 2 shows a covered machine.

The following discussion concerns implementing a common backplane for an ATM switch and a SONET switch having the form factor of FIG. 2 (i.e., twelve adapter card slots 201a-1, four switch card slots 202a-d and two processor card slots 203a-b). That is, the same backplane design may be integrated into either an ATM switch or a SONET switch. Integrating means securing the backplane into a system or switch, typically done within a manufacturing environment. However, it will be evident that embodiments having different amounts of adapter, switch, and processor card slots are possible.

Furthermore, it will be evident that different embodiments also exist for networks and physical layer technologies beyond ATM and SONET, respectively. That is, more generally, this discussion is applicable to a common backplane that may be used for both a physical layer system and a networking layer system. Using the OSI reference model, a physical layer system is a system that supports only the data link layer and physical layer, while a networking layer system is a system that supports the networking layer.

Figure 3A:
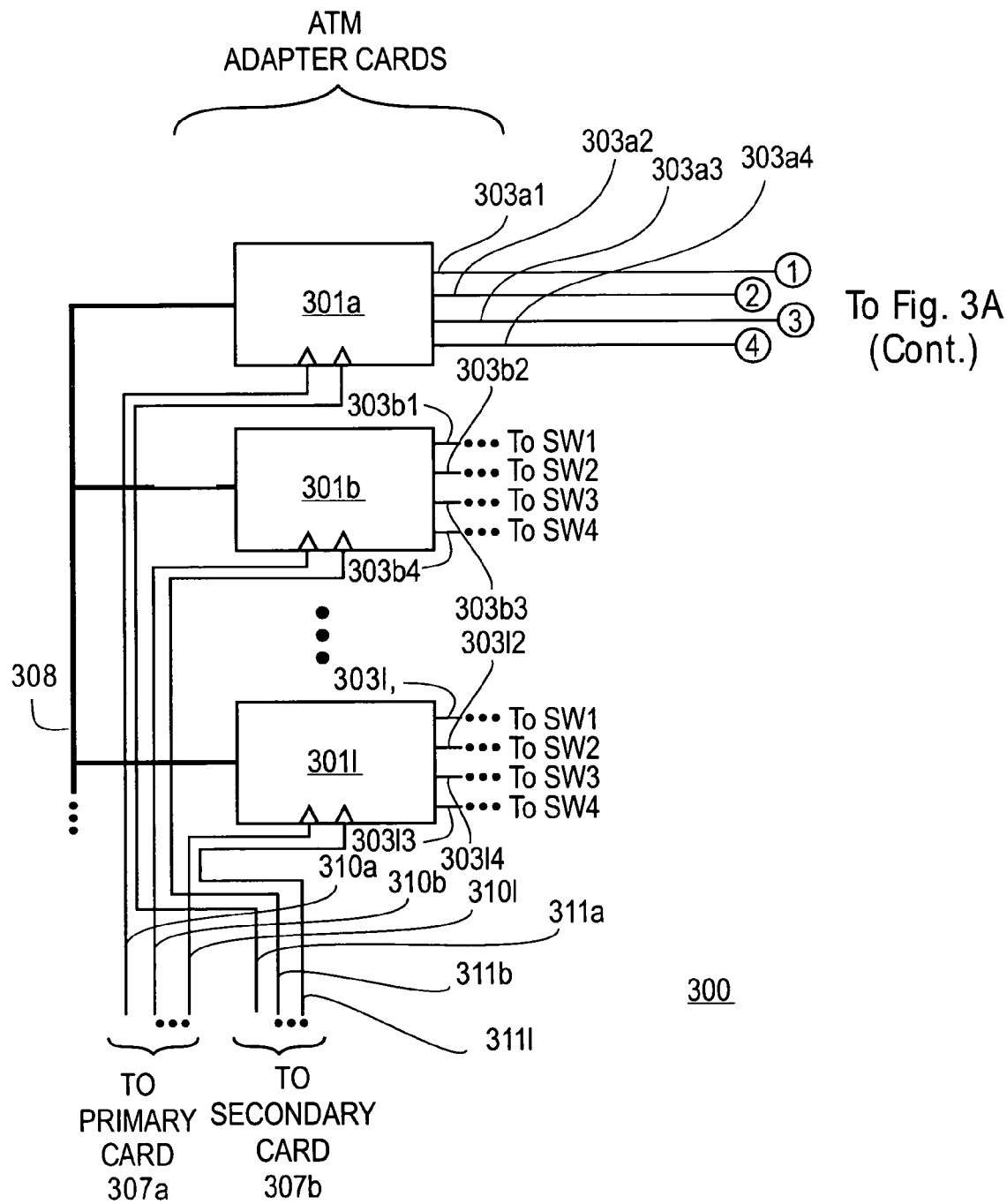
FIG. 3A shows an embodiment of an ATM switch.
Figure 3A:
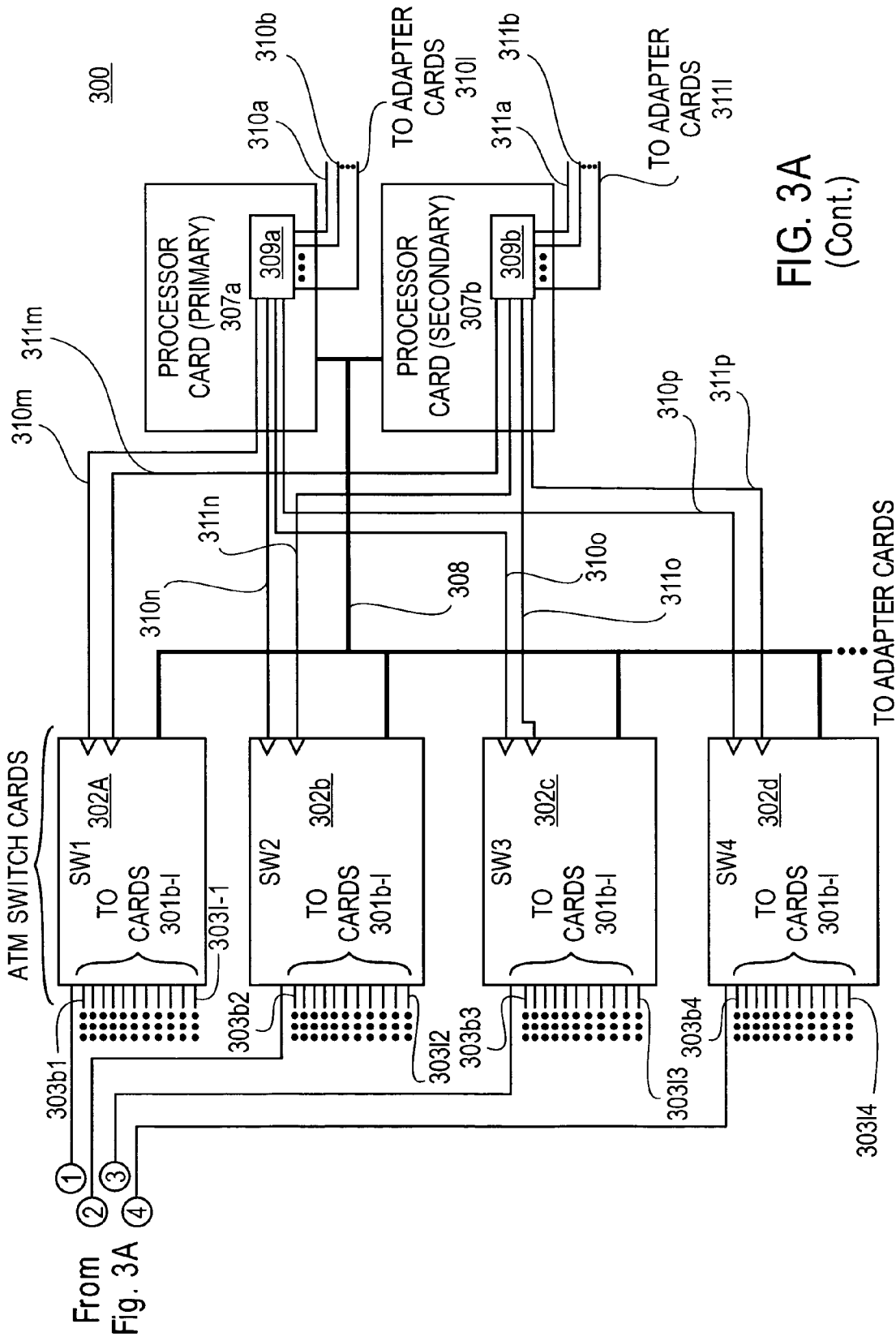

FIG. 3, shows an ATM switch 300 constructed within the form factor shown with respect to FIG. 2. For simplicity, FIG. 3 merely shows connections between cards. That is, inputs are not necessarily on the left of a card nor are outputs necessarily on the right of a card. The switch shown in FIG. 3 can hold a maximum of 12 ATM adapter cards 301a-1. Thus, ideally, each ATM adapter card 301 requires a data pathway to each of the four ATM switch cards 302a-d. This is accomplished by wiring a major link 303 between each ATM adapter card 301a-1 and each ATM switch card 302a-d. For example, major links 303a1-4 connect ATM adapter card 301a to ATM switch cards 302a, 302b, 302c and 302d respectively.

As this incoming traffic of ATM adapter cards 301a-1 is ideally spread out and handled across all of the available ATM switch cards 302a-d, typically there is a major link 303 between each ATM switch card and every ATM adapter card. Thus, in the embodiment of FIG. 3, there are four major links 303 per ATM adapter card 301, each major link 303 represents the total point to point bandwidth between that ATM adapter card 301 and the particular ATM switch cards. For example, major link 303a1 represents the total point to point bandwidth between the first adapter card 301a and the first switch card 302a, major link 303a2 represents the total point to point bandwidth between the adapter card 301a and the second switch card 302b, etc.

Figure 3B:
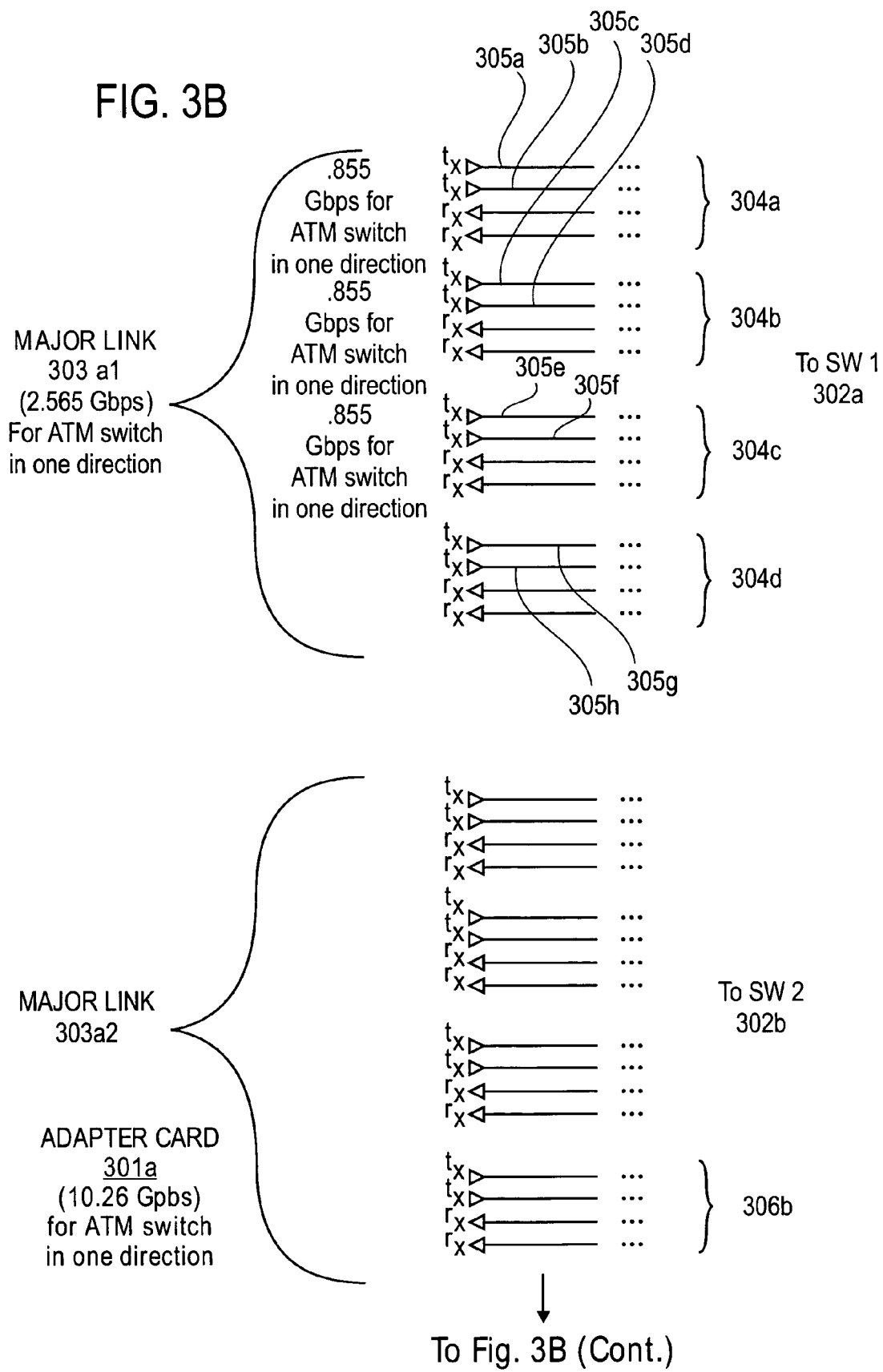
FIG. 3B shows an embodiment of a major link architecture for the ATM switch of FIG. 3A.

Furthermore, as major links represent the total bandwidth between an adapter card and a switch card, each major link 303 may be comprised of multiple minor links where each minor link corresponds to actual conducting traces implemented in the backplane. That is, major links 303 are also representations of the aggregation of a plurality of actual point to point links, referred to as minor links, that are physically wired within the backplane. In the embodiment of FIG. 3a,b, each major 303 link is actually comprised of at least three minor links. For example, as shown in FIG. 3b, major link 303a1 is implemented with three minor links 304a,b,c plus a fourth minor link 304d is added for redundancy. The major link concept may include any redundant minor links (within the associated major link), such as minor link 304d, even though redundant links do not necessarily contribute bandwidth to the major link 303 during normal operation.

The point to point minor links 304 of the embodiment shown in FIG. 3b are implemented with differential channels and, as such, have two conducting traces associated with each minor link in a single direction: one "+" conducting trace (e.g., trace 305a) and one "−" conducting trace (e.g., trace 305b). Thus for the embodiment shown in FIG. 3b, there are eight actual backplane traces 305a-h per major link (2 backplane traces per minor link×4 minor links per major link=8 backplane traces per major link) in one direction (such as inbound or outbound). When considering both inbound and outbound directions, there are four backplane traces per minor link (resulting in sixteen actual backplane traces per major link). Other embodiments may or may not comprise differential signals depending on the speed, signal trace distance across the backplane, and/or noise within the minor link environment. Thus the number of actual backplane traces per minor link is also case by case dependent.

The relationship between the redundant minor link (e.g., link 304d) and the three other minor links (which may also be referred to as real data minor links) 304a-c follows. First, since the fourth minor link 304d is declared redundant, the switch may operate at full capacity without utilization of the redundant link 304d. Thus minimum guaranteed system bandwidth calculations may be made without reference to the redundant link 304d bandwidth and, as such (using the embodiment of FIG. 3b as an example), only the three real data minor links 304a-c are considered. In the embodiment of the ATM switch of FIG. 3 a minimum guaranteed bandwidth of 9.952 Gbps, in one direction, per adapter card (equivalent to an OC-192 pipeline per adapter card) exists. In order to evenly spread out an adapter card's traffic across the four switch cards 302a-d, each major link 303 must support at least 2.488 Gbps (9.952/4=2.488) in one direction.

In this embodiment, the minor links are implemented with application specific integrated circuit (ASIC) point to point chipsets each having a 1.25 Gbps baud rate in one direction. A baud rate is the actual signal speed of the link. It is usually higher than the data rate in order to account for line encoding or other overhead. Thus, as these ASICs employ 8B/10B encoding and also have 14.5% overhead (for handshaking, etc.) the actual data rate offered by these chipsets is reduced to 0.855 Gbps (1.25 GbPs×0.8×(1−0.145)=0.855 Gbps). Thus the three real data minor links 304a-c gives a total major link bandwidth of 2.565 Gbps (0.855 Gbps×3=2.565 6 bps), in one direction, which is sufficient to support the 2.488 Gbps minimum guaranteed traffic rate per major link. Again, the above mentioned data rates are the total bandwidth in one direction (e.g., inbound or outbound).

Thus, one should first define the desired point to point bandwidth between each adapter card and each switch card. Some of the more simple designs have the same desired bandwidth between every adapter card and every switch card. Other designs may have different desired bandwidths between various adapter cards and various switch cards. For example, a subset of adapter cards may require more (or less) bandwidth than other adapter cards. Furthermore, a subset of switch cards may be able to provide service for more (or less) bandwidth than other switch cards.

Once the desired point to point bandwidth (i.e., the major link) between each adapter card and each switch card is defined the specific physical implementation (i.e. the minor link(s)) of each major link may be defined. Exactly how many minor links are to be created per major link is a function of many different factors which may include (but are not necessarily limited to) link technology and backplane signal space.

For example, high end machines are less sensitive to cost and therefore may employ higher speed point to point technology which is typically more expensive than lower speed technology. As minor link speed increases (e.g., using an aforementioned higher speed technology) the number of needed minor links needed to realize the major link bandwidth decreases. This in turn saves backplane signal space. Thus there is typically a tradeoff between backplane space and the technology used to implement the minor links. The optimum tradeoff is determined on a case by case basis as different machines may target different markets having unique pricing structures. Thus in some cases it may be most efficient to have only one minor link per major link which maximizes backplane real estate efficiency whereas in other cases it may be most efficient to have six, seven or more minor links per major link which consumes backplane signal space at a greater rate. The former case requires more sophisticated, high speed technology (such as GaAs, fiber optics, and/or a custom design) while the later requires less sophisticated technology (such as Si, copper, and/or off the shelf parts). Furthermore, as the ultimate goal is to design a common backplane for more than one machine, the aforementioned tradeoff should be analyzed for a group of machines as a whole as opposed to one specific machine. Ideally, multiple machines may be designed that employ the minor link backplane traces. Different data rates may be run over the minor links for each machine reflecting different system performance.

The number of minor links reserved for redundancy purposes is also a matter of choice that is determined on a case by case basis. Generally, higher end machines serving more sophisticated markets require more redundancy while lower end machines require less redundancy. The specific embodiment discussed in relation to FIG. 3 has three ATM switch cards (e.g., switch cards 302a, b, c) normally in use and one switch card for redundancy (e.g., switch cards 302d). A redundant card is basically an extra card. Such a system may be referred to as 3:1 redundancy. In this system there is a minimum guaranteed system bandwidth equal to 3 switch cards of bandwidth. For example each switch card of FIG. 3 has a per switch card bandwidth of approximately 50 Gbps. Thus the minimum guaranteed system bandwidth is approximately 150 Gbps.

The redundant switch card 302d may be used solely for redundancy purposes. That is, it is never used unless another switch card 302a,b or c goes down. In still other embodiments the redundant switch card may be used in normal operation which has the effect of increasing the maximum system bandwidth (e.g., from approximately 150 Gbps to approximately 200 Gbps). In this case, if a switch card goes down, the system bandwidth is merely reduced to its minimum guaranteed (e.g., three switch cards) of bandwidth.

The major link structure of three real data minor links 304a, b, c and one redundant minor link 304d is attributable to the 3:1 redundancy scheme of the system shown in FIG. 3. Other systems may have less redundancy (e.g., 4:1, 5:1, 6:1, no redundancy . . . etc.) or more redundancy (e.g., 2:1, 1:1). Thus there also exists a multitude of other possible embodiments regarding the ratio of real data minor links to redundant minor links for each major link.

In one embodiment of the system shown in FIG. 3, the redundant link 302d is not used unless a switch card goes down. If a switch card goes down, every major link 303 in communication with the down switch card is no longer useful. In order to compensate for this, each adapter card 301 redirects the traffic normally scheduled to the down switch card to the remaining active switch cards which now includes an activated redundant switch card 302d.

In this embodiment, only three minor links (the real data links 304a, b, c) actually carry traffic per major link 303 prior to a switch card 302 going down. Thus for each down switch card 302 there are three down real data minor links 304 per adapter card. Furthermore, as each adapter card 301 still has three working major links 303 and each of these working major links have a redundant link, there are also three available redundant links in communication with each of the three working switch cards.

Thus in this embodiment, each adapter card 301 therefore recovers from a down switch card 302 by filling one of the available redundant links with traffic normally directed for one of the down real data minor links.

As an example, referring to FIGS. 3a and 3b, assume that switch card 302a goes down. Adapter card 301a then loses functionality of major link 303a1. Thus adapter card 301a must redirect traffic normally scheduled to the three real data minor links 304a-c that comprise major link 303a1. Adapter card 301a has three remaining major links (303a2-4), each of which have an associated redundant link 306b-d. Each redundant link 306b-d is in communication with a working switch card, thus the adapter card 301a redirects the traffic across these three redundant links 306b-d.

In this embodiment, redundant links are not used unless a switch card goes down. However, in other embodiments, a working major link 303 may have its traffic load spread out across all its minor links including a redundant minor link (in order to, for example, load share the logic at the adapter and switch cards). Thus, in such an embodiment, the redundant links carry a pro rata share of the major link's traffic load. To some extent, in normal working conditions, the distinction between real data and redundant minor links is lost. Once a switch card goes down, however, the redundant link distinction is resumed at each of the working major links. That is, the adapter card forces all the traffic normally directed to the down major link to the redundant minor links associated with the remaining operational major links.

As discussed, the aforementioned redundancy scheme is referred to as 3:1 redundancy. That is, the ATM switch 300 is typically sold on the open market as having a maximum guaranteed bandwidth of only three switch cards. A fourth switch card may be used in normal operation which simply adds to achievable system bandwidth. If a switch card fails the machine still operates at its minimum guaranteed (three card) bandwidth after the adapter cards appropriately reroute their traffic across the working redundant links to the remaining three switch cards. Alternatively, the fourth switch card is not used unless and until another switch card fails. In this case the minimum guaranteed system bandwidth is equal to the maximum achievable system bandwidth (of three cards).

Referring to FIG. 3a again, note the presence of processor cards 307a,b. As discussed, processor cards 307a,b are typically used for running system configuration and maintenance software. In the embodiment of FIG. 3, one processor card (e.g., processor card 307a) is the primary card while the other processor card (e.g., processor card 307b) is the secondary (redundant) card. Thus redundancy schemes may be employed for the processing card as well. The primary card 307a is normally active while the secondary card 307b remains inactive unless and until the primary card goes down.

The processor cards 307a, b may communicate with the switch cards 302a-d and adapter cards 301a-1 across a processing system bus 308. The processing system bus 308 may be an industry standard bus such as ISA or PCI or may even be any proprietary design. A bus is any multidrop platform. That is, unlike a point to point link arrangement where only two cards communicate with each other, in a multidrop platform, the various cards communicate over the same conducting traces. As such, some degree of arbitration or conflict resolution is typically provided to prevent two cards from employing the bus at the same time. Essentially any bus capable of communicating with a processing system may be employed.

Furthermore, a bus does not necessarily need to be employed. That is, a point to point arrangement may also be employed.

Also note that the system clocking 309a,b (also referred to as clock drivers) may be integrated into the processor cards 307a,b. System clocking 309a,b maintains synchronous operation between the adapter cards 301 and switch cards 302. For the clocking of the ATM system shown in FIG. 3 a 20.833 MHz clock may be launched in a point to point manner to each adapter card 301a-1 (and switch card 302a-d). That is, there is a point to point clock trace 310a-1, 311a-1 between each adapter card 301a-1 and a clock driver 309a,b on the processor card 307a,b as well as a point to point connection 310m-p, 311m-p between each switch card 302a-b and a clock driver 309a,b on the processor card 307a, b.

Skew may be controlled by keeping a fixed length for the clock traces 310a-1, 311a-1. Thus adapter card interfaces closest to the processor card interfaces tend to have associated clock traces that wind back and forth within the backplane in order to have a trace lengths equal to the clock lines that travel to adapter card interfaces farther away from the processor card interfaces. The redundancy discussed in relation to the processor cards affects clocking as well. That is since the clocking function may be integrated onto the processor card, in one embodiment, the clocking on the secondary card 307b is not used unless and until the primary processor card 307a goes down.

Although the specific embodiment shown in FIG. 3 integrates the clocking onto the processor card, other embodiments need not employ such a scheme. That is, there may instead exist a clock card (or a pair of clock cards if redundancy is employed). A clock card is a card having substantially only clock driving capability. Again, whether a clock card is to be used or not may be decided on a case by case basis. Clock cards require additional card interfaces but reduce processor card complexity.

Figure 4A:
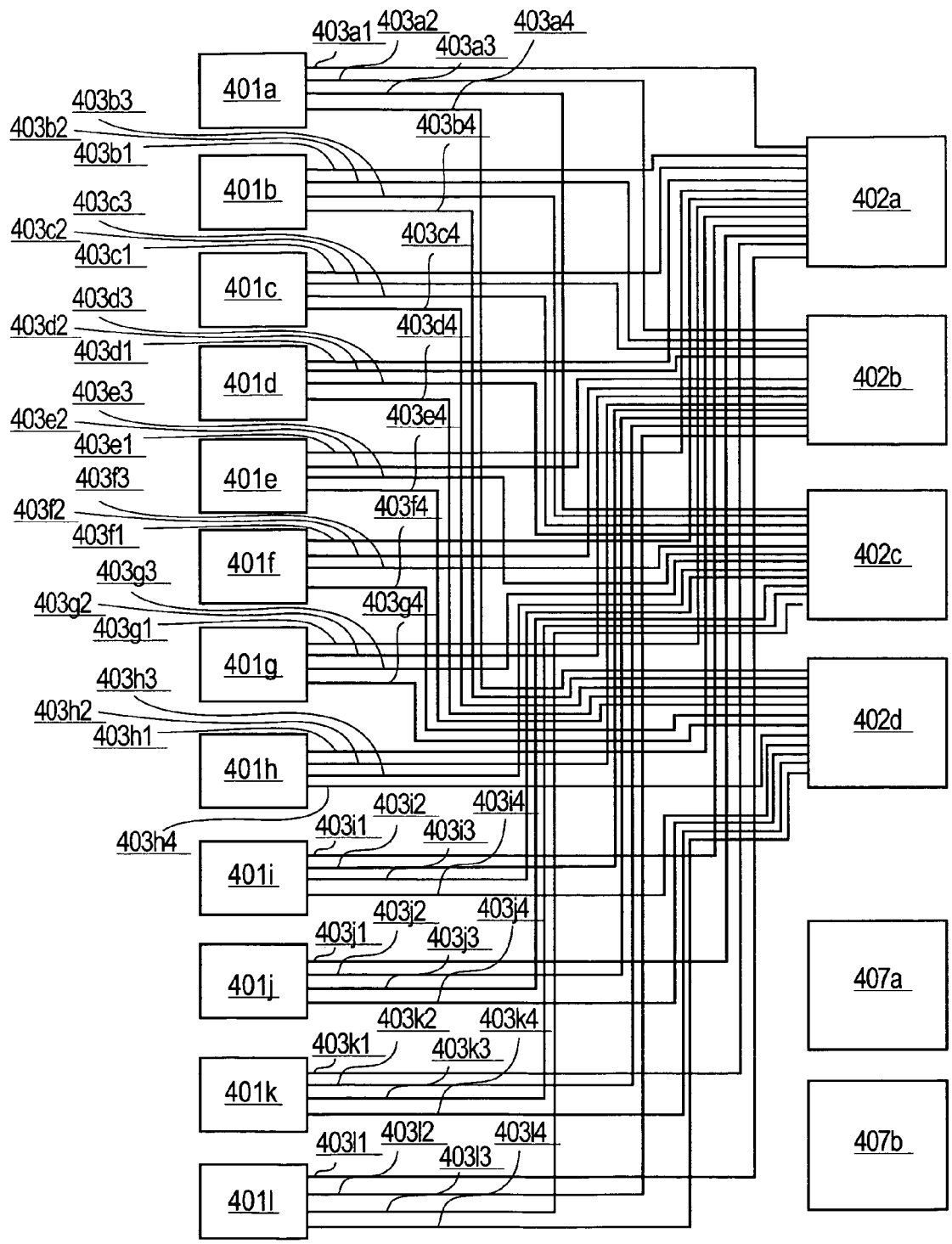
FIG. 4A shows a major link backplane design for the ATM switch of FIG. 3.
Figure 4B:
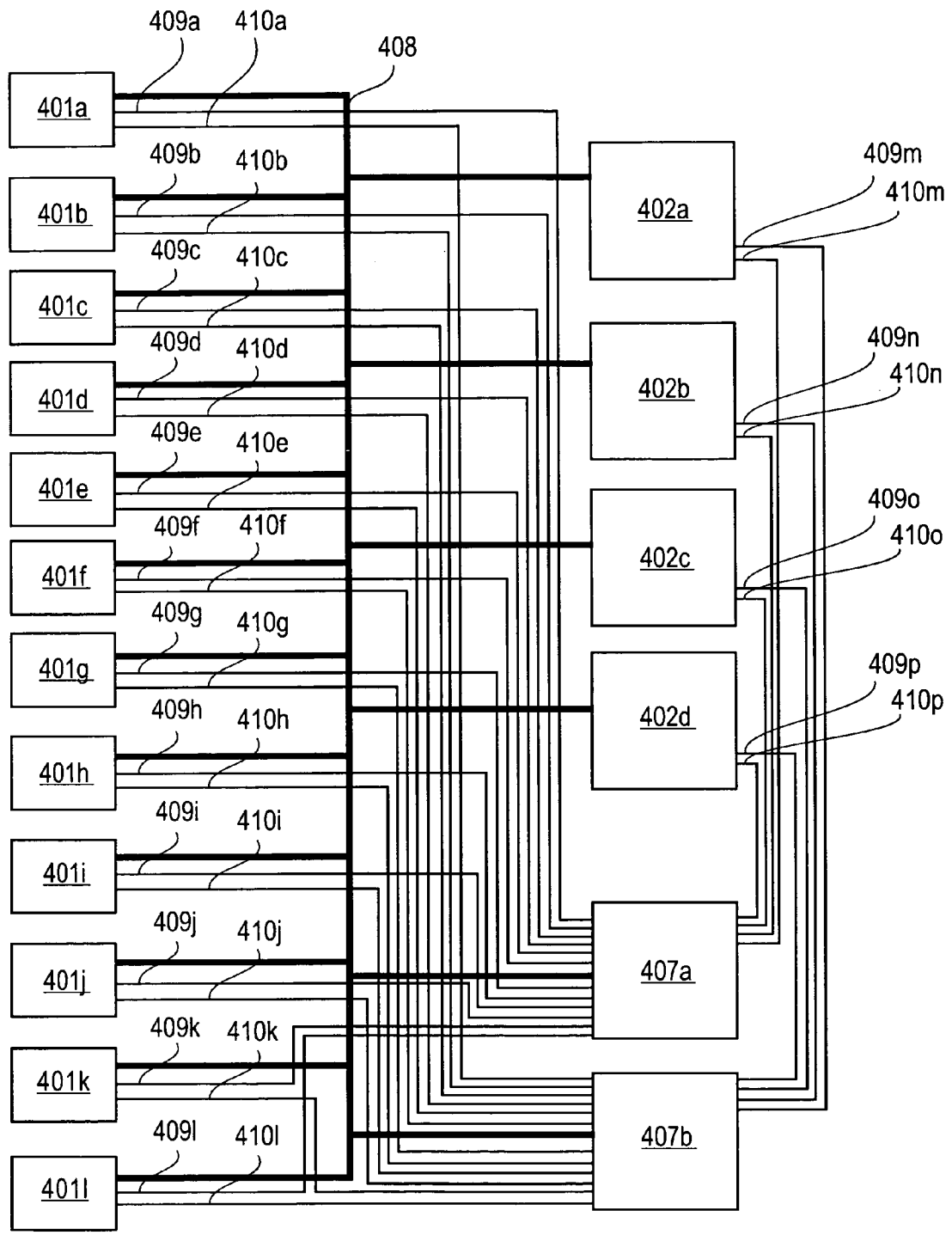
FIG. 4B shows a system bus and clock trace backplane design for the ATM switch of FIG. 3.

FIG. 4 shows backplane design for the ATM switch system 300 just described in FIG. 3. FIG. 4a shows major link 403 wiring and FIG. 4b shows system bus 408 and clock trace 409,410 wiring. It is important to realize the backplane comprises the wiring of both FIGS. 4a and 4b. Furthermore, other backplane traces (such as power supply and ground traces) are not shown in order to simplify these figures.

Referring to FIG. 4a there are twelve adapter card interfaces 401a-1, four switch card interfaces 402a-d and two processor card interfaces 407a,b. An adapter card interface 401 mates with an adapter card, a switch card interface 402 mates with a switch card and a processor card interface 407 mates with a processor card. The wiring scheme of FIG. 4a comprises forty-eight major links 403a1-4, 403b1-4, . . . 40311-4 which correspond to four major links 403 per adapter card interface 401. Each adapter card major link 403 runs to a different switch card interface 402. For example, major links 403a1, 403b1, . . . 40311 run to the first switch card interface 402a while major links 403a2, 403b2, . . . 40312 run to the second switch card interface 402b, etc.

Interfaces wired together may be deemed coupled together via the trace that connects them. For example, switch card interface 402a is coupled to adapter card interface 401a via major link 403a1. Furthermore, recall that each major link is typically the aggregation of multiple minor links. For example, in one embodiment, the adapter card interfaces 401 are actually wired as shown back in FIG. 3b. That is, each major link 403 corresponds to 16 nets in the backplane.

Referring to FIG. 4b, a system bus 408 connects both processor card interfaces 407a,b to every adapter card interface 401a-1 and every switch card interface 402a-d. A system bus 408 may comprise tens or even hundreds of backplane nets per card interface; thus system bus 408 is drawn thicker than other nets. Also, there are multiple clock traces 409a-p and 410a-p. In the embodiment of FIG. 4b, every clock trace 409a-p, 410a-p is a single point to point net. Thus, unlike the system bus 408 design which connects to more than two card interfaces, each clock trace 409, 410 is a dedicated trace between two card interfaces. A point to point trace preserves the characteristic impedance throughout the trace (whereas introducing multiple input/outputs per net as in a multidrop scheme, such as a bus, can disrupt the characteristic impedance) and reduces reflections. Thus, signal integrity is preserved for the clock traces 409,410 of FIG. 4B. Note that in this embodiment, clock lines 409 are driven by the primary card while clock lines 410 are driven by the secondary card 407b. In summary FIGS. 4a and 4b show the backplane design needed to implement the ATM switch shown with reference to FIGS. 2 and 3.

To summarize the discussion so far, the design of a backplane comprises four major considerations: 1) the desired bandwidth (major link) between each adapter card and the switching cards; 2) the system bus employed by the processing cards; 3) the clock nets from the clock driver and 4) redundancy.

Redundancy may be implemented for switch cards, processor cards and/or clocking functions. Implementing redundancy generally adds additional backplane signals wherever it occurs. For example, in the aforementioned example, redundancy increased the number of backplane traces per major link, the number of processor card slots and the number of clock signal backplane traces. Furthermore, the amount of additional complexity is a function of the degree of redundancy employed. For example, the 3:1 redundancy discussed in reference to the major link embodiment of FIG. 3 added an additional minor link to each major link. However, if 3:2 redundancy had been employed, two additional minor links would have been added per major link along with a fifth adapter card.

In order to develop a common backplane platform, functional level (e.g., switch card, processor card, and clock driver) consideration and redundancy implementation must be compared and contrasted as between the two or more systems seeking to use the common backplane. At one extreme, a complex backplane may be developed having nets used only with one system coexisting with other nets used only with another system. This approach should be minimized and/or eliminated where possible. Rather, a common or nearly identical design (at least in terms of specific backplane traces if not data rates, etc.) should be strived for at each functional level as well as its associated redundancy. The following discussion concerns a SONET switch configured to use the backplane of FIG. 4. It will be evident the aforementioned guidelines have been considered.

FIG. 5 shows an embodiment of a SONET switch 500. The SONET switch 500 of FIG. 5 may be implemented with the backplane described back in FIG. 4. A common backplane platform means the same backplane is used for at least two different systems. Thus, one backplane is integrated into at least two different systems. In the embodiment discussed herein, the backplane designed according to FIGS. 4A and 4B is integrated into the ATM switch 300 of FIG. 3a,b as well as the SONET switch 500 of FIG. 5. Thus, the SONET switch adapter cards 501a-1 may mate with the twelve adapter card interfaces 401a-1 (referring briefly back to FIG. 4a) and the two SONET switch cards 502a, b may mate with two switch card interfaces (e.g., 402a,b referring briefly back to FIG. 4a).

Note, in this embodiment, the SONET switch 500 embodied in FIG. 5 has a reduced bandwidth design point as compared to the ATM switch 300 of FIG. 3. Thus, in the embodiment discussed herein, the SONET switch cards 502a, b offer approximately 30 Gbps of switching capacity per switch card 502a, b while the ATM switch cards (302 of FIG. 3) offer approximately 50 Gbps of switching capacity per switch card. As the SONET switch 500 only requires a guaranteed bandwidth of approximately 30 Gbps as a system, full bandwidth may be achieved with only one of the switch cards 502a,b where one of the switch cards (e.g., 502b) is redundant (by comparison the ATM switch requires as much as 150 Gbps as a system, thus three switch cards are needed with one card used as redundant). As a result, in these embodiments, SONET switch 500 only needs to support 2.488 Gbps per adapter card 501a-1 (as opposed to 9.952 Gbps for the ATM switch).

In order to promote backplane re-use, it is optimum to configure the backplane such that both the ATM switch cards and SONET switch cards functionally mate to the same input/outputs associated with an adapter card interface. This is possible if a major and minor link scheme is used for both the ATM and SONET systems.

In such a case, the minor link conducting traces are reused. That is, referring to both FIGS. 4a and 5, the backplane traces that correspond to major links 403a1, b1, c1 ... 11 of FIG. 4 may be used to implement the real data major links 503a1, b1, c1 ... 11 of FIG. 5, since these major links 403a1, b1, c1 ... 11 connect each adapter card interface 401a-1 to the switch card interface 402a. Similarly, the backplane traces that correspond to major links 403a2, b2, c2, ... 12 may be used to implement the redundant major links 503a2, b2, c2 ... 12, since these traces connect each adapter card interface 401a-1 to the switch card interface 402b. The distinction between real data and redundant major links for the embodiment of the SONET switch 500 of FIG. 5 is discussed ahead.

Thus, as the backplane of FIG. 4 is used, the SONET system 500 uses major links 503 to communicate between adapter cards 501 and switch cards 502 where each major link 503 is comprised of four minor links (as shown in FIG. 3b). However, since in this embodiment the SONET system 500 only requires 2.488 Gbps per adapter card, each minor link (e.g. minor link 304a of FIG. 3B) carries an OC-12 traffic rate (e.g., 622 Mbps). Thus, in the SONET system 500 the four minor links associated with a real data major link (e.g. real data major link 503a1) carry real data to a switch card, unlike the ATM system 300 where only three minor links 304a,b,c were real data minor links and one minor link 304d was redundant. This stems directly from the differences between the redundancy approaches undertaken between the two systems. Again, SONET switch 500 redundancy is discussed ahead.

Thus to summarize so far, for the purposes of realizing a common backplane, the design of the SONET switch 500 of FIG. 5 has been affected by the ATM switch 300 design of FIG. 3. Specifically, the switch card switching capacities were compared and it was determined that the SONET system 500 requires only two switch cards in comparison to four for the ATM system 300. In order to re-use the switch card interfaces, it is optimum for the SONET system 500 to use a major link architecture similar to the ATM system 300. In so doing, the same minor link backplane traces are used for both systems and a second, custom backplane design to implement the means for communication between the adapter cards and the switch cards is unnecessary for the SONET system 500.

Next then, is consideration and implementation of the redundancy. The redundancy approach may be either of the two ways discussed in relation to the ATM switch 300. That is, one embodiment may configure the redundant switch card 502b to operate if and only if the primary switch card 502a fails. In an alternate embodiment, both switch cards are used during normal operation. Regardless of which embodiment is used, the guaranteed system bandwidth is equivalent to the switching capacity of one SONET switch card (30 Gbps). If the later approach is used, the redundant switch card increases system bandwidth to twice that of the guaranteed minimum. In such an embodiment, if a switch card fails the system bandwidth falls back to the guaranteed bandwidth. As discussed previously, other systems employing more or less redundancy are also possible.

In one embodiment, the SONET switch 500 of FIG. 5 employs the former redundancy scheme (where the redundant switch card 502b is only used if the primary card 502a does down). In this embodiment, major links 503a2, 503b2, 503c2, ... 50312 are redundant as they are each connected to redundant switch card 502b. Major links 503a1, 503b1, 503c1, ... 50311 may be referred to as the real data major links as each are connected to the primary switch card 502a. Thus during normal conditions, each adapter card 501 directs all incoming traffic across the real data major links 503a1, 503b1, 503c1, ... 50311. If and when primary switch card 502a goes down, each adapter card will redirect all its traffic across redundant major links 503a2, 503b2, 503c2, ... 50312 to redundant switch card 502b.

Next the processor card is discussed for the ATM switch 500. Ideally, the processor cards 507a,b are the same for both the ATM and SONET systems. This is possible since the hardware platform (e.g., microprocessor, etc.) needed to run the maintenance software is typically the same. In such a case, the system bus 508 may be the same as that used in the ATM switch 300 (of FIG. 3) resulting in perfect re-use of the system bus 408 backplane wiring (of FIG. 4b). Alternatively even if a different hardware platform is used for the maintenance software, the same bus system may still be used if, for example, the different microprocessors simply are configured to use the same bus or a bridge chip is available that can bridge the system bus of the non-conforming microprocessor to the system bus 408 wired in the backplane.

Thus, the SONET switch 500 embodiment of FIG. 5 has processor cards 507a,b which are coupled to a system bus 508 which in turn is coupled to every adapter card 501 and switch card 502. Also in this embodiment, each processor card 507a,b has integrated upon it an associated system clocking driver 509a,b. Each clocking driver 509a,b launches clock signals on their point to point associated clock nets 510a-p, 511a-p.

Because the ATM and SONET systems may run on different clocks (for one embodiment, the ATM system runs on a 20.833 MHz clock while the SONET system runs on a 19.44 MHz clock), conceivably, there may exist two different processor cards—one for each system. If this approach is pursued, the backplane of FIG. 4b is still suitable. That is, the clock lines 409a-p and 410a-p carry either an ATM system clock frequency (e.g., 20.833 MHz) or a SONET system clock frequency (19.44 MHz) depending on the type of processor card (ATM or SONET) that mates with the processor card interface 407a,b.

It is generally more cost effective, however, to populate a single processor card with the clock source driver designs for both systems 300,500. This allows a single processor card design to work with either the ATM or SONET systems. The added cost of populating processor cards with additional (potentially never utilized) chips is more than offset than tracking demand for and inventorying two different processor cards.

Further, as discussed below, a processor card having both clocking designs may be utilized in a hybrid machine that combines ATM switch functionality with SONET switch functionality.

Thus an embodiment that incorporates the ATM clocking and the SONET clocking circuitry on the same card is typically employed. The remaining question then remains whether to gate either clock on the processor card such that clocks may only run on the single set of backplane traces 409a-p, 410a-p (referring back to FIG. 4b). An alternative embodiment would entail introducing a whole new set of traces (not shown in FIG. 4) that essentially duplicates backplane traces 409a-p, 410a-p allowing each processor card to simultaneously launch a whole set of ATM clocks and SONET clocks sufficient to run a full ATM system and SONET system.

In the embodiment shown in FIG. 4b, the proper clock is gated at the processor card. That is, if an ATM switch is implemented with the common backplane, the processor cards allow only the ATM system frequency into the backplane while if a SONET switch is implemented with the same processor card it allows only the SONET system frequency into the backplane. This embodiment requires a more sophisticated processor card (since it has the added clock gate function) and is best suited for applications less sensitive to processor card cost than backplane space/cost.

The alternate embodiment, not shown in FIG. 4b, duplicates the number of clock traces shown in FIG. 4b. In this other embodiment, the processor cards mated to processor card interface 407a,b launch both SONET and ATM clocks continuously. This embodiment is to be contradistiguished from the prior embodiment, since it is best suited for applications more sensitive to processor card costs and less sensitive to backplane space/cost.

Figure 6:
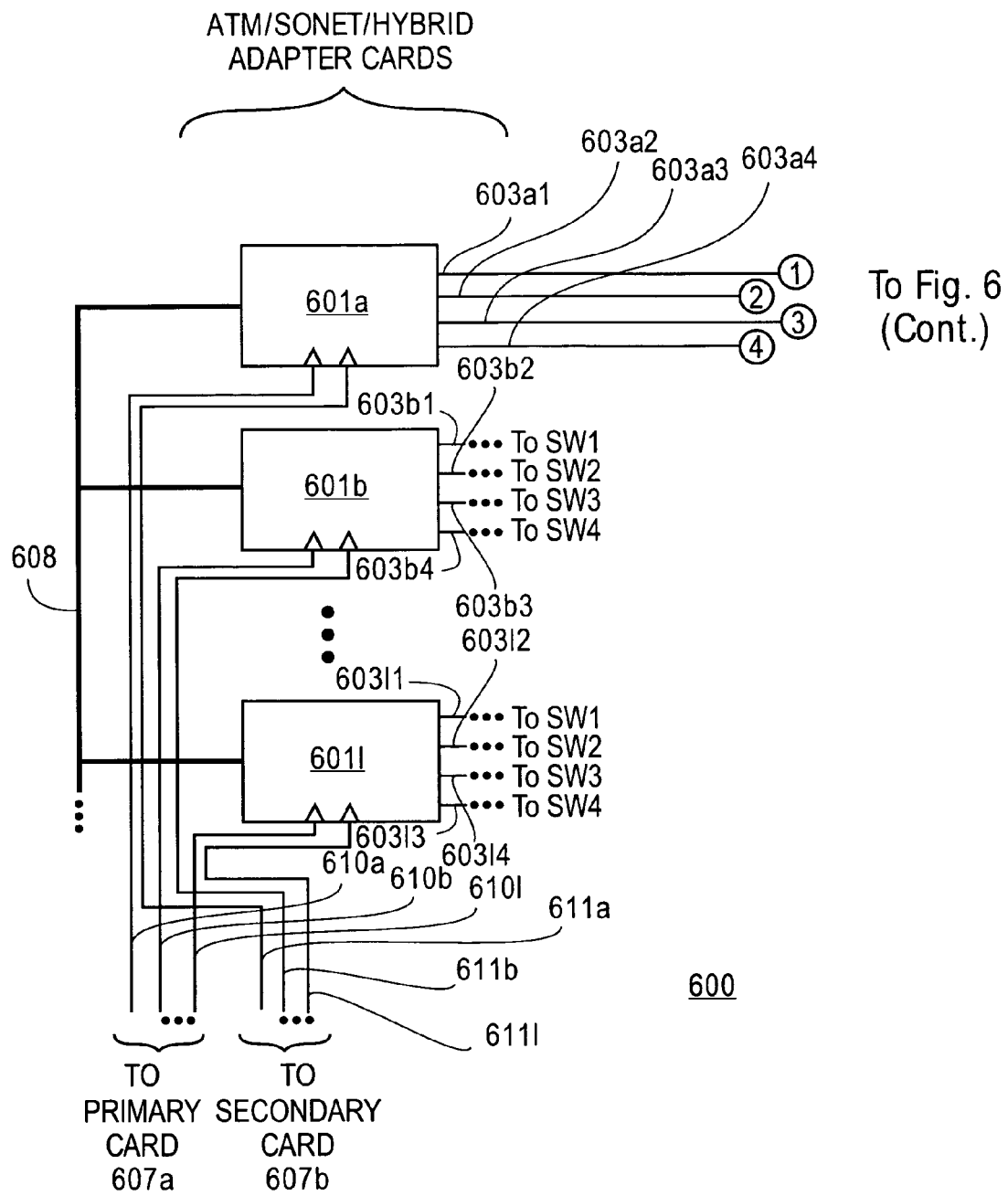
FIG. 6 shows an embodiment of a hybrid ATM/SONET switch.
Figure 6:
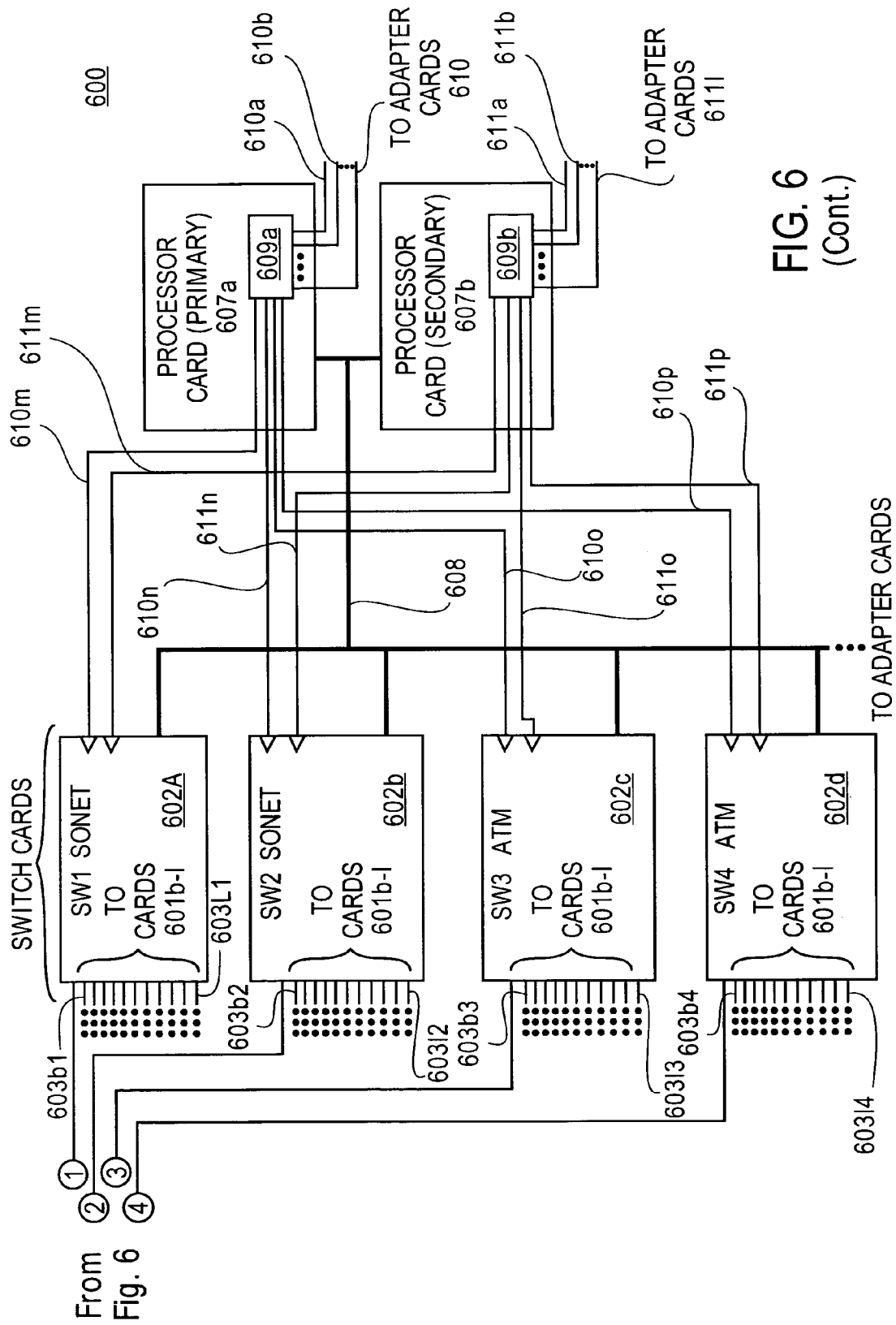

FIG. 6 shows the architecture for a hybrid system 600 that performs both ATM switching and SONET switching. In this embodiment, the hybrid system has (again) twelve adapter cards 601a-1 and four switch cards 602a-d. Furthermore, the major link, processing and clocking are similar to the previous two systems, again, in order to maximize backplane wiring re-use. However, there are typically two ATM switch cards 602c,d and two SONET switch cards 602a,b. The ATM switch cards 602c,d typically populate the third and fourth switch card interfaces while the SONET switch cards typically populate the first and second switch card interfaces. Thus, each adapter card 601a-1 typically has its first two major links 603a1,a2, 603b1,b2, . . . 603l1,12 connected to the SONET switch cards 602a,b and the second two major links 603a3,a4, 603b3,b4, . . . 603l3,14 connected to the ATM switch card 602c,d.

In order to fully utilize developed hardware, the hybrid system should be workable with the pre-existing ATM adapter cards (301 of FIG. 3) and SONET system adapter cards (501 of FIG. 5). This may be implemented provided ATM adapter cards 301 are configured to function as if switch cards in the first and second switch card slots are down. That is, since SONET switch cards 602a,b are in the first and second switch card interfaces, ATM adapter cards should be configured to only send traffic across major links 603a3,a4, 603b3,b4, . . . 603l3,14. This lowers the maximum sustainable offered load per ATM adapter card (in this embodiment, to OC-48 speeds from the OC-192 speed of the ATM system 300 of FIG. 3). However, this bandwidth reduction follows from the fact that only two ATM switch cards 602c,d are in the hybrid system 600 embodiment of FIG. 6. SONET adapter cards remain at OC-48 maximum speed in this embodiment and, furthermore, by design (i.e., referring to FIG. 5) only use major links 603a1,a2,603b1,b2, . . . 603l11,12. Note that FIG. 6 does not identify whether ATM or SONET cards are populating the adapter card interfaces. As long as the aforementioned conditions are met it is irrelevant which cards populate which slots. Similar to both the ATM switch (300 of FIG. 3) and the SONET switch (500 of FIG. 5), the hybrid system 600 has two processor cards 607a,b with associated clocking circuit 609a,b and clocking nets 610a-p, 611a-p. Thus, again, the backplane of FIG. 4 may be used to implement the hybrid system 600.

For that the embodiment of the hybrid system discussed so far, the ATM and SONET adapter cards are only capable of communicating with their respective switch cards. That is, ATM adapter cards may only communicate with the ATM switch cards 602c,d and the SONET adapter cards may only communicate with the SONET switch cards 602a,b since the major links of each not only operate at different speeds but also may employ different semiconductor chips on either end of each major link (which may use different encoding schemes, handshaking, etc.).

However, a third hybrid adapter card (discussed next) is capable of directing traffic over to either switch card. As the system 600 represented in FIG. 6 is capable of acting as both an ATM switch and a SONET switch it is possible that different cells arriving on the same SONET line (that is, SONET lines may be used to connect to a network for either ATM or SONET adapter cards) will require either ATM switching or SONET switching. As such, there is a need for a hybrid adapter card that is capable of directing network traffic to/from either the ATM switch cards 602c,d or the SONET switch cards 602a,b.

Figure 7:
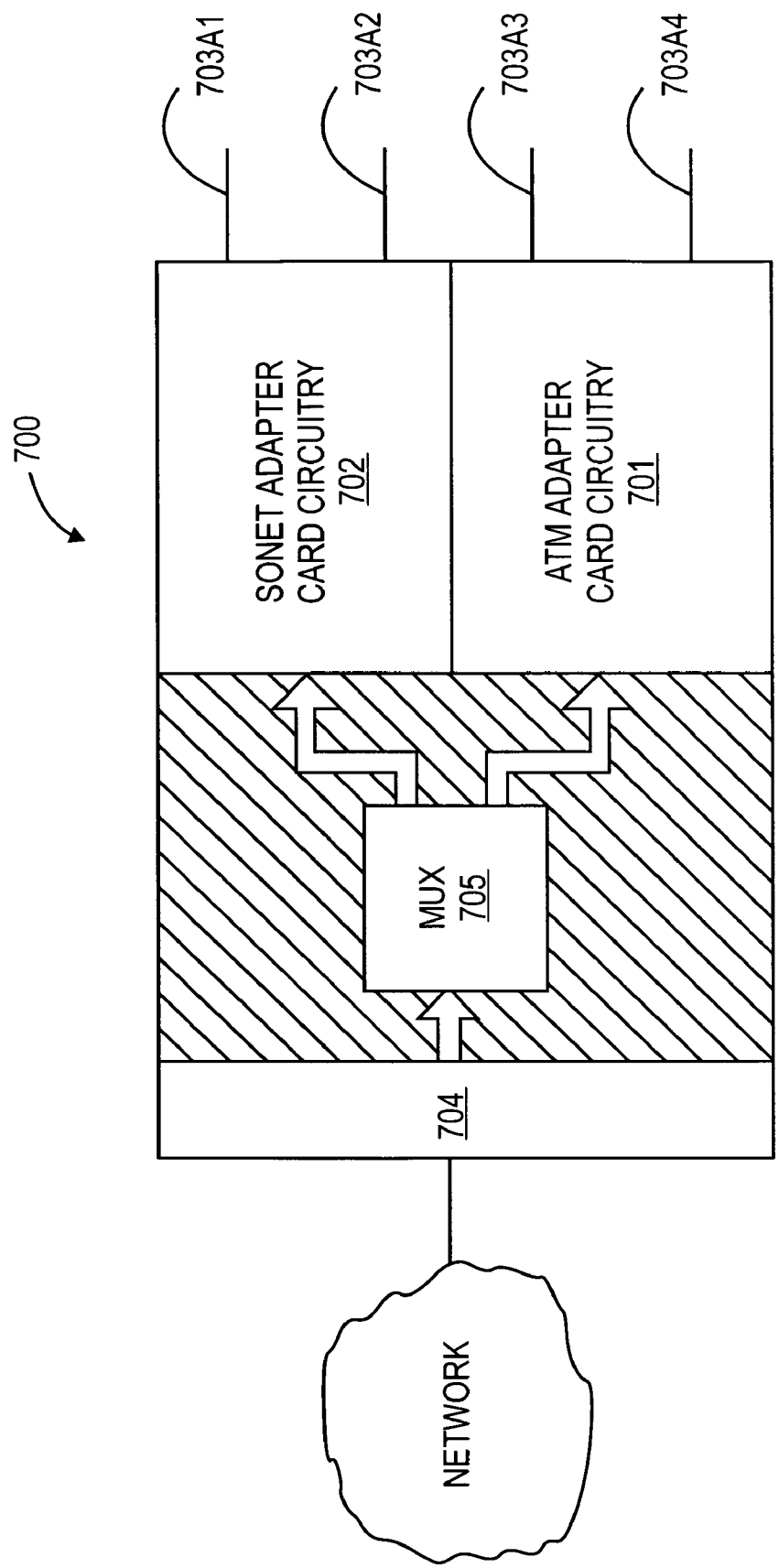
FIG. 7 shows an embodiment of a hybrid adapter card used in the hybrid ATM/SONET switch of FIG. 6.

An embodiment of such a hybrid adapter card 700 is shown in FIG. 7. Hybrid adapter card 700 has circuitry for an ATM adapter card 701 and circuitry for a SONET adapter card 702 where each is coupled to its proper major links 703. That is, the ATM adapter card circuitry 701 portion is coupled to major links 703a and 703b while the SONET adapter card circuitry 702 portion is coupled to major links 703c and 703d. Inserted between the network interface module 704 (e.g., a fiber optic link module that connects to a physical line such as a SONET line) is a MUX block 705 which screens incoming traffic, labels it as ATM or SONET and directs it to the proper portion of the card (either ATM 701 or SONET 702). The MUX block 705 also collects traffic from the two portions of 701,702. For example, the MUX block 705 may be informed during connection setup which cells within a SONET frame are ATM cells and which cells are SONET cells. By keeping in phase with the framing sequence of the SONET line, the MUX block 704 is able to pick off ATM cells and direct them to the ATM adapter circuitry 701 and pick off SONET cells and direct them to the SONET adapter circuitry 702.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   forming a backplane according to a manufacturing process, said backplane designed to support different networking systems that include both an ATM system and a SONET system;
   integrating said backplane into one of an ATM system and a SONET system; and receiving one or more switch cards on said backplane, said one or more switch cards being only ATM switch cards configured for only switching ATM traffic if said backplane is integrated into said ATM system, said one or more switch cards being only SONET switch cards configured for only switching SONET traffic if said backplane is integrated into said SONET system.

2. The method of claim 1 wherein said manufacturing process further comprises forming minor link conducting traces associated with a major link.

3. The method of claim 2 wherein said forming minor link conducting traces further comprises forming a pair of differential transmit conducting traces.

4. The method of claim 3 wherein said forming minor link conducting traces further comprises forming a pair of differential receive conducting traces.

5. The method of claim 1 wherein said manufacturing process further comprises forming system bus conducting traces.

6. The method of claim 1 wherein said manufacturing process further comprises forming clock traces.

7. The method of claim 1 further comprising affixing a card interface to said backplane.

8. The method of claim 7 further comprising affixing an adapter card interface to said backplane.

9. The method of claim 7 further comprising affixing a switch card interface to said backplane.

10. The method of claim 7 further comprising affixing a processor card interface to said backplane.

11. The method of claim 1 wherein said manufacturing process further comprises a lithographic process that employs a mask set.

* * * * *